(12) United States Patent
Chen

(10) Patent No.: US 9,454,071 B2
(45) Date of Patent: *Sep. 27, 2016

(54) PROJECTION SCREEN AND PROJECTION SYSTEM THEREOF

(71) Applicant: National Tsing Hua University, Hsinchu (TW)

(72) Inventor: Cheng-Huan Chen, Hsinchu (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 18 days.

This patent is subject to a terminal disclaimer.

(21) Appl. No.: 14/330,275

(22) Filed: Jul. 14, 2014

(65) Prior Publication Data

US 2015/0015799 A1    Jan. 15, 2015

(30) Foreign Application Priority Data

Jul. 15, 2013   (TW) .............................. 102125195 A

(51) Int. Cl.
*G03B 21/62* (2014.01)
*G03B 21/60* (2014.01)
*G02B 5/00* (2006.01)

(52) U.S. Cl.
CPC ................ *G03B 21/60* (2013.01); *G02B 5/00* (2013.01); *G03B 21/62* (2013.01)

(58) Field of Classification Search
CPC  G02B 5/0242; G02B 5/0278; G02B 5/0284; G02B 5/045; H04N 9/3105; H04N 9/3167; G03B 21/28
See application file for complete search history.

(56) References Cited

U.S. PATENT DOCUMENTS

| | | | | |
|---|---|---|---|---|
| 7,101,048 | B2* | 9/2006 | Travis | G02B 27/0081 345/8 |
| 2008/0030632 | A1* | 2/2008 | Murata | G02F 1/133512 349/5 |
| 2008/0246895 | A1* | 10/2008 | Kuwata | G02F 1/1334 349/5 |

* cited by examiner

*Primary Examiner* — Sultan Chowdhury
(74) *Attorney, Agent, or Firm* — WPAT, PC; Justin King

(57) ABSTRACT

A projection screen includes a substrate and an optical microstructure. The substrate has a projection area for projecting an image onto the projection area. The projection area includes a plurality of arrayed optical regions. Each of the optical regions includes a first and second optical sub-region with optical characteristics of reflective scattering/ transmissive scattering/specular reflection and simple transmission, wherein an area of the second optical sub-region is larger than that of the first optical sub-region. The optical microstructure is arranged on the substrate for guiding the light of the image to a specific direction. The above-mentioned projection screen with two or more optical characteristics, for example, can be at the same time as the front projection screen and the rear projection screen, or allows the user to watch background image behind the projection screen. A projection system including the above-mentioned projection screen is also disclosed.

16 Claims, 3 Drawing Sheets

PROJECTION SCREEN AND PROJECTION SYSTEM THEREOF

BACKGROUND OF THE INVENTION

1. Field of the Invention

The present invention relates to a projection screen and a projection system, and more particularly to a projection screen and a projection system with various optical characteristics.

2. Description of the Prior Art

Conventional projection screens are divided into front projection screens and rear projection screens with different optical characteristics respectively. Projection screens have an optical characteristic of reflective scattering and rear projection screens have an optical characteristic of transmissive scattering. For both types of screens, they are not transparent, that is to say, users cannot view the background from the other side of the projection screen. Therefore, usage of the projection screens is restricted. For example, when showcase glass is used as a projection screen, displays inside the showcase cannot be viewed by outside consumers.

Thus, finding an effective method for changing optical characteristics of projection screens to enrich usage thereof is the current target.

SUMMARY OF THE INVENTION

The present invention is directed to a projection screen, wherein at least one of the optical regions is corresponding to one pixel of the projected image, and each of the optical regions comprises at least two optical sub-regions and each of them has different optical characteristic such as reflective scattering, transmissive scattering, simple transmission or specular reflection. As a result, the projection screen of the present invention can be used as a front projection screen and a rear projection screen at the same time or when the projection screen is used as a front projection screen or a rear projection screen, users can view the background from the other side of the projection screen. Besides, by arranging an optical microstructure corresponding to the optical sub-region, light can be guided to a specific direction to improve optical efficiency, privacy or image quality.

In one embodiment of the present invention, the proposed projection screen includes a substrate and an optical microstructure. The substrate has a projection area for a projection device to project an image onto the projection area, wherein the projection area comprises a plurality of arrayed optical regions, at least one optical region is corresponding to one pixel of the image, and each of the optical regions comprises a first optical sub-region and a second optical sub-region. The first optical sub-region has a first optical characteristic of reflective scattering, transmissive scattering or specular reflection, the second optical sub-region has a second optical characteristic of simple transmission, and an area of the second optical sub-region is larger than that of the first optical sub-region. The optical microstructure is corresponding to at least one of the first optical sub-region and the second optical region for guiding the light of the image to a specific direction.

In another embodiment of the present invention, the proposed projection system comprises a projection device configured for projecting an image; and a projection screen comprising a substrate and an optical microstructure. The substrate has a projection area for the projection device to project the image onto the projection area, wherein the projection area comprises a plurality of arrayed optical regions, at least one optical region is corresponding to one pixel of the image, and each of the optical regions comprises a first optical sub-region and a second optical sub-region. The first optical sub-region has a first optical characteristic of reflective scattering, transmissive scattering or specular reflection, the second optical sub-region has a second optical characteristic of simple transmission, and an area of the second optical sub-region is larger than that of the first optical sub-region. The optical microstructure is corresponding to at least one of the first optical sub-region and the second optical region for guiding the light of the image to a specific direction.

The objective, technologies, features and advantages of the present invention will become apparent from the following description in conjunction with the accompanying drawings wherein certain embodiments of the present invention are set forth by way of illustration and example.

BRIEF DESCRIPTION OF THE DRAWINGS

The foregoing conceptions and their accompanying advantages of this invention will become more readily appreciated after being better understood by referring to the following detailed description, in conjunction with the accompanying drawings, wherein.

DESCRIPTION OF THE PREFERRED EMBODIMENT

The detailed explanation of the present invention is described as follows. The described preferred embodiments are presented for purposes of illustrations and description, and they are not intended to limit the scope of the present invention.

Figure 1:
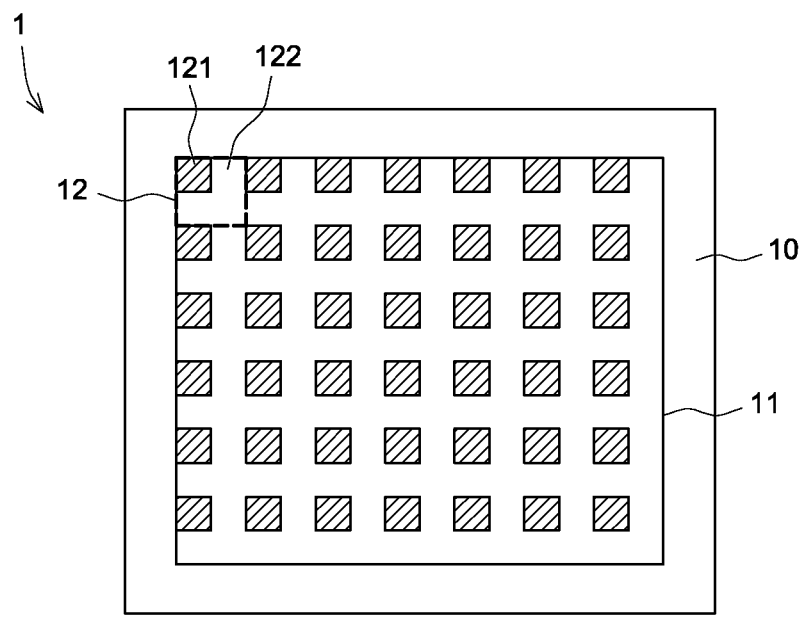
FIG. 1 is a diagram schematically illustrating a projection screen according to first embodiment of the present invention.
Figure 2:
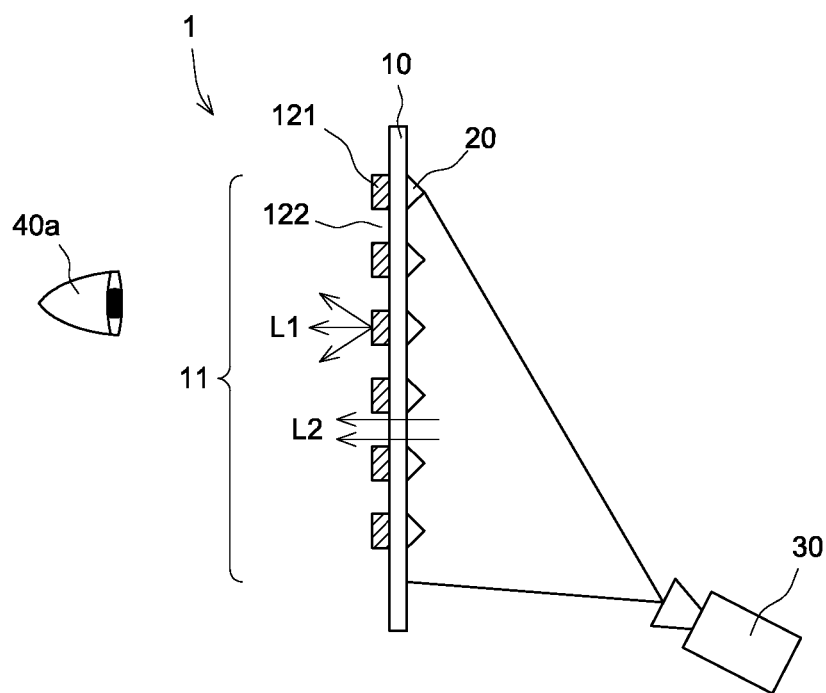
FIG. 2 is a diagram schematically illustrating a application of projection screen according to first embodiment of the present invention.

Referring to FIG. 1 and FIG. 2, in one embodiment of the present invention, the proposed projection screen 1 includes a substrate 10 and optical microstructure 20. The substrate 10 has a projection area 11 for a projection device 30 to project an image onto the projection area 11 of the projection screen 1. In one embodiment, the substrate 10 can be glass or polymers. For example, polymers can be polycarbonate, polyacrylic acid, polymethacrytic acid, polyacrylic ester, polyurethane, polyvinylchloride, polystyrene, polyolefin, cyclic olefin-based resin or polyethylene terephthalate.

The projection area 11 comprises a plurality of arrayed optical regions 12, and the one or more optical regions 12 is corresponding to one pixel of the image projected on the projection screen 1, that means the size of the optical regions 12 is equal to or smaller than the size of one pixel of the image. It could be understood that the array can be periodical array or aperiodic array. For example, the optical region 12 can be randomly distributed according to pixels of the image. Otherwise, the optical region 12 is distributed in different periodical arrays. For example, the optical region 12 is arranged more densely in the center of the projection area 11 but arranged sparsely in the periphery area of the projection area 11 or in a reverse manner. Each of the optical regions 12 comprises a first optical sub-region 121 and a second optical sub-region 122, wherein the first optical sub-region 121 and the second optical sub-region 122 have different optical characteristics. In one embodiment, optical characteristics can be reflective scattering, transmissive scattering, simple transmission or specular reflection etc. By incorporating the first optical sub-region 121 and the second optical sub-region 122 with different optical characteristics together, types of projection screens can be designed for different uses. The optical microstructure 20 is arranged on the substrate 10 and corresponding to at least one of the first optical sub-region 121 and the second optical sub-region 122. The optical microstructure 20 can guide the light of the image projected by the projection device 30 to a specific direction such as specific range of viewing angle and thus improve optical efficiency of the projection device 30.

In one embodiment, the optical microstructure 20 can be a triangle structure. The light projected by the projection device 30 can enter the inside of the triangle structure perpendicularly to a surface of the triangle structure and then undergoes total internal reflection by another surface of the triangle structure to a specific direction. It could be understood that angle and direction between each optical structure 20 and the projection device 30 may changes slightly. Preferably, design of each optical microstructure 20 can be optimized according to the position of the projection device 30. For example, parameters of the triangle structure, such as angle, edge length, direction and position may be different. Other types of optical microstructures 20 (e.g. curved surfaces or spherical surfaces) can be implemented according to conventional arts and will not be elaborated hereinafter.

Referring to FIG. 2, for example, the first optical sub-region 121 has a first optical characteristic of transmissive scattering, and the second optical sub-region 122 has a second optical characteristic of simple transmission. When the projection device 30 projects an image onto the projection area 11, the incident light of the image can transmit and diffuse from the first optical sub-region 121 to enable the viewer 40a to view the image projected onto the projection area 11, as light L1 showing. In this case, the projection screen 1 is considered as a rear projection screen. Besides, because the second optical sub-region 122 has an optical characteristic of simple transmission, the viewer 40a also can view the background from the other side of the projection screen 1, as light L2 showing. It should be noticed that the first optical sub-region 121 is evenly distributed within the projection area 11 to make the projected image substantially overlap the background.

It can be understood that because the second optical sub-region 122 allows the light to pass through it directly, if the optical axis of the light projected by the projection device 30 is parallel to the line of sight, the viewer 40a will see the transmissive light directly and feel uncomfortable. To prevent direct incidence of the projected light into the viewer's eyes, an angle between the optical axis of the light projected by the projection device 30 and the line of sight of the viewer 40a should be maintained. By using the optical microstructure 20 to guide the light of the image projected by the projection device 30 in viewer's direction, optical efficiency of the projection device 30 can be promoted. In one embodiment, for the purpose of privacy, the optical microstructure 20 can guide the light of the image in a narrower range of viewing angle to prevent the image displayed on the projection screen 1 from being watched by outsiders. From another aspect, the optical microstructure 20 can guide reflected light, which may cause interference to the image, outside the range of viewing angle to maintain image quality.

It can be understood, by adjusting area ratio of the second optical sub-region 122 with the optical characteristic of simple transmission, transparency of the projection screen 1 can be controlled. In one embodiment, area of the second optical sub-region 122 is larger than that of the first optical sub-region 121. For example, in order to comply with traffic legislation or policy, the second optical sub-region 122 occupies 75% or above of the optical region 12. Additionally, optical characteristics of the first optical sub-region 121 can be changed for different usage. For example, when the first optical sub-region has the optical characteristic of specular reflection, the projection screen 1 possesses the optical characteristic of partial specular reflection. Thus, the projection screen 1 can be applied to a reflection screen of a head up display (HUD).

Figure 3:
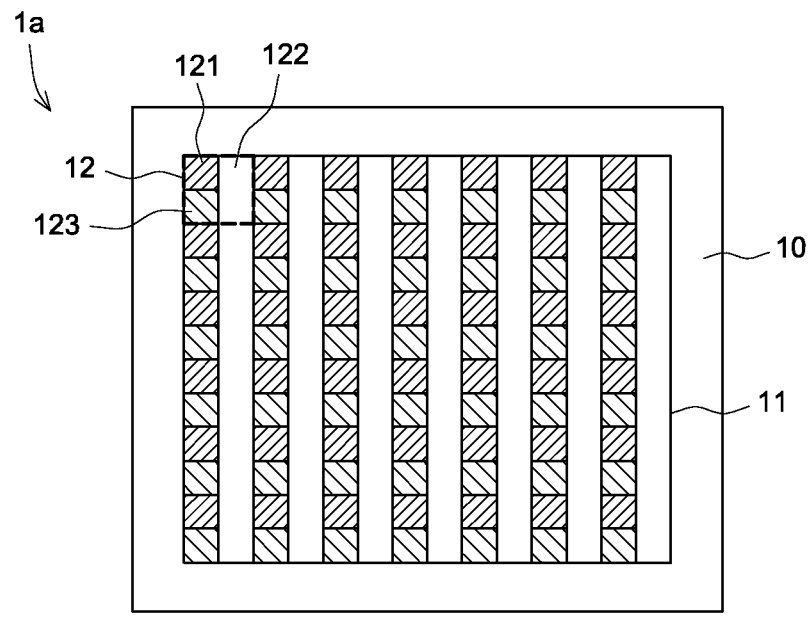
FIG. 3 is a diagram schematically illustrating a projection screen according to second embodiment of the present invention.
Figure 4:
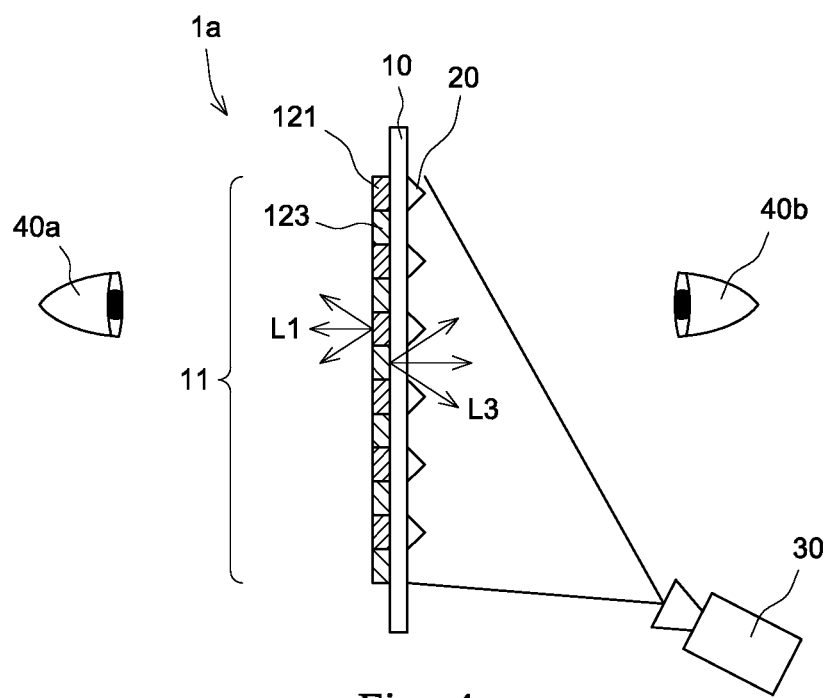
FIG. 4 is a diagram schematically illustrating a application of projection screen according to second embodiment of the present invention.

Referring to FIG. 3 and FIG. 4, in one embodiment of the present invention, each optical region 12 of the projection screen 1a further comprises a third optical sub-region 123 having an optical characteristic different from the optical characteristics of the first optical sub-region 121 and the second optical sub-region 122. For example, the first optical sub-region 121 has a first optical characteristic of transmissive scattering, the second optical sub-region 122 has a second optical characteristic of simple transmission and the third optical sub-region 123 has a third optical characteristic of reflective scattering. According to the structure mentioned above, when the projection device 30 projects an image onto the projection area 11, incident light of the image can transmit and diffuse from the first optical sub-region 121 to enable the viewer 40a to view the image projected onto the projection area 11, as light L1 showing. Incident light of the image can reflect and diffuse from the third optical sub-region 123 to enable viewer 40b to view the image projected onto the projection area 11, as light L3 showing. In this case, the projection screen 1a is considered as a rear projection screen and a front projection screen at the same time. Besides, because the second optical sub-region 122 has an optical characteristic of simple transmission, the viewers 40a and 40b are able to view each other, as light L2 and light L4 showing.

It should be noticed that the optical microstructure 20 is not arranged on the third optical microstructure 123 referring to the embodiment shown in FIG. 4. However, in order to increase optical efficiency or for the purpose of privacy or image quality, the optical microstructure 20 can be arranged corresponding to the third optical sub-region 123. In one embodiment, the first optical sub-region 121 with the optical characteristic of transmissive scattering and the third optical sub-region 123 with the optical characteristic of reflective scattering are respectively arranged on opposite sides of the substrate 10. By this way, incident light can reflect from the surface of the same side where the projection device 30 is located.

Figure 5:
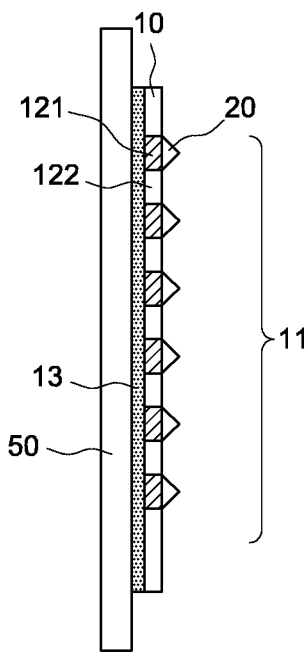
FIG. 5 is a diagram schematically illustrating a projection screen according to third embodiment of the present invention.

The optical characteristic of scattering can be implemented by a variety of suitable ways. For example, microcylindrical lens array, surface roughening treatment, plastic films, hologram films can be applied on the surface of the substrate 10 to scatter light. Otherwise, as shown in FIG. 5, scattering particles can be implanted into the substrate 10 to scatter light.

Figure 6:
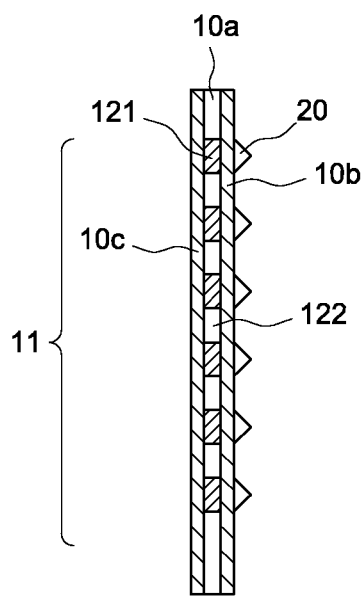
FIG. 6 is a diagram schematically illustrating a projection screen according to fourth embodiment of the present invention.

In one embodiment, optical characteristics of at least one of the first optical sub-region 121 and the second optical sub-region 122 is implemented by an optical modulation module which selectively changes the optical characteristics of at least one of the first optical sub-region 121 and the second optical sub-region 122 between transmissive scattering and simple transmission or between reflective scattering and simple transmission. For example, referring to FIG. 6, the optical modulation module comprises a polymer dispersed liquid crystal (PDLC) layer 10a and two transparent electrodes 10b and 10c respectively arranged at opposite sides of the polymer dispersed liquid crystal layer 10a and selectively providing an electric field to change the optical characteristic of the polymer dispersed liquid crystal layer 10a. For example, the polymer dispersed liquid crystal layer 10a has an optical characteristic of reflective scattering or transmissive scattering when there is no electric field applied; and the polymer dispersed liquid crystal layer 10a has another optical characteristic of simple transmission when an electric field is applied.

Aforementioned embodiments use an electric field to selectively change optical characteristics of the optical modulation module between reflective scattering/transmissive scattering and simple transmission, but not limited to this. By using proper technique, optical characteristic of the optical modulation module also can be selectively changed between specular reflection and simple transmission or between reflective scattering/transmissive scattering and specular reflection. Besides, area ratio of the first optical sub-region 121 and the second optical sub-region 122 can be adjusted by controlling the electric field to control optical characteristics (e.g. transparency) of the projection screen. It should be noticed that arrangement of the optical modulation module can cover entire or part of the projection area 11.

In one embodiment, optical characteristics of the optical microstructure 20 can be adjusted by applying electric field. For example, the optical microstructure 20 can be implemented by using LCD lens or electrowetting. That is to say, the curved surface is caused by applying electric field and optical characteristic of the optical microstructure 20 can be implemented. Besides, curved rate of the curved face can be controlled by changing the electric field density. Technical details can be referred to conventional arts and will not be elaborated hereafter.

In one embodiment, the optical region 12, the first optical sub-region 121 and the second sub-region 122 can be the same or different in geometric shape. Geometric shapes can be circle or polygonal such as triangle, square or hexagonal etc. When one of the optical sub-regions has the optical characteristic of simple transmission, the other optical sub-region can be irregular in shape.

Referring to FIG. 5, in one embodiment, the projection screen of the present invention further comprises an adhesive layer 13 arranged on a surface of the substrate 10 for adhering the substrate 10 on a transparent material 50 according to user requirements, which makes the transparent 50 a projection screen. For example, the transparent material 50 can be glass of showcase or car windows.

In conclusion, for the projection screen according to the present invention, each pixel of the projected image is corresponding to the at least one optical region, and each of the optical regions comprises at least two optical sub-regions and each of them has different optical properties such as reflective scattering, transmissive scattering, simple transmission or specular reflection. As a result, the projection screen of the present invention can be applied in a variety of applications. For example, the projection screen of the present invention can be used as a front projection screen and a rear projection screen at the same time or when the projection screen is used as a front projection screen, a rear projection screen or a reflection screen of head-up display (HUD), users can view the background from the other side of the projection screen. Additionally, by arranging an optical microstructure corresponding to the optical sub-region, light of the image can be guided to a specific direction to improve optical efficiency, privacy or image quality.

While the invention is susceptible to various modifications and alternative forms, a specific example thereof has been shown in the drawings and is herein described in detail. It should be understood, however, that the invention is not to be limited to the particular form disclosed, but to the contrary, the invention is to cover all modifications, equivalents, and alternatives falling within the spirit and scope of the appended claims.

What is claimed is:

1. A projection screen comprising:
   a substrate having a projection area for a projection device to project an image onto the projection area, wherein the projection area comprises a plurality of arrayed optical regions, at least one optical region is corresponding to one pixel of the image, and each of the optical regions comprises a first optical sub-region and a second optical sub-region, wherein the first optical sub-region has a first optical characteristic of reflective scattering, transmissive scattering or specular reflection, the second optical sub-region has a second optical characteristic of simple transmission, and an area of the second optical sub-region is larger than that of the first optical sub-region; and
   an optical microstructure arranged on the substrate and corresponding to at least one of the first optical sub-region and the second optical sub-region for guiding the light of the image to a specific direction.

2. The projection screen according to claim 1, wherein each of the optical regions further comprises a third optical sub-region having a third optical characteristic of reflective scattering, transmissive scattering or specular reflection, and the third optical characteristic is different from the first optical characteristic; the optical microstructure is corresponding to at least one of the first optical sub-region, the second optical region and the third optical sub-region.

3. The projection screen according to claim 1, wherein the first optical characteristic of reflective scattering or transmissive scattering is implemented by applying micro-cylindrical lens array, surface roughening treatment, plastic films, hologram films or implanting scattering particles in the substrate.

4. The projection screen according to claim 1, wherein the first optical characteristic is implemented by an optical modulation module which selectively changes the first optical characteristic as reflective scattering/transmissive scattering/specular reflection or simple transmission.

5. The projection screen according to claim 4, wherein the optical modulation module comprises a polymer dispersed liquid crystal (PDLC) layer and two transparent electrodes respectively arranged at opposite site of the polymer dispersed liquid crystal layer and selectively providing an electric field to change the optical characteristic of the polymer dispersed liquid crystal layer.

6. The projection screen according to claim 1, wherein the optical region, the first optical sub-region and the second optical sub-region are the same or different in the shape of circle or polygon.

7. The projection screen according to claim 1, wherein the optical microstructure is implemented by applying electric field to selectively control optical characteristics.

8. The projection screen according to claim 1, wherein the substrate is polycarbonate, polyacrylic acid, polymethacrytic acid, polyacrylic ester, polyurethane, polyvinylchloride, polystyrene, polyolefin, cyclic olefin-based resin or polyethylene terephthalate.

9. A projection system comprising:
a projection device configured for projecting an image; and
a projection screen comprising a substrate which has a projection area for the projection device to project the image onto the projection area, wherein the projection area comprises a plurality of arrayed optical regions, at least one optical region is corresponding to one pixel of the image, and each of the optical regions comprises a first optical sub-region and a second optical sub-region, wherein the first optical sub-region has a first optical characteristic of reflective scattering, transmissive scattering or specular reflection, the second optical sub-region has a second optical characteristic of simple transmission, and an area of the second optical sub-region is larger than that of the first optical sub-region; and
an optical microstructure arranged on the substrate and corresponding to at least one of the first optical sub-region and the second optical sub-region for guiding the light of the image to a specific direction.

10. The projection system according to claim 9, wherein each of the optical regions of the projection screen further comprises a third optical sub-region having a third optical characteristic of reflective scattering, transmissive scattering or specular reflection, and the third optical characteristic is different from the first optical characteristic; the optical microstructure is corresponding to at least one of the first optical sub-region, the second optical region and the third optical sub-region.

11. The projection system according to claim 9, wherein the first optical characteristic of reflective scattering or transmissive scattering is implemented by applying microcylindrical lens array, surface roughening treatment, plastic films, hologram films or implanting scattering particles in the substrate.

12. The projection system according to claim 9, wherein the first optical characteristic is implemented by an optical modulation module which selectively changes the first optical characteristic as reflective scattering/transmissive scattering/specular reflection or simple transmission.

13. The projection system according to claim 12, wherein the optical modulation module comprises a polymer dispersed liquid crystal (PDLC) layer and two transparent electrodes respectively arranged at opposite site of the polymer dispersed liquid crystal layer and selectively providing an electric field to change the optical characteristic of the polymer dispersed liquid crystal layer.

14. The projection system according to claim 9, wherein the optical region, the first optical sub-region and the second optical sub-region are the same or different in the shape of circle or polygon.

15. The projection system according to claim 9, wherein the optical microstructure can be implemented by applying electric field to selectively control optical characteristics.

16. The projection system according to claim 9, wherein the substrate is polycarbonate, polyacrylic acid, polymethacrytic acid, polyacrylic ester, polyurethane, polyvinylchloride, polystyrene, polyolefin, cyclic olefin-based resin or polyethylene terephthalate.

* * * * *